(12) United States Patent
Lee (10) Patent No.: US 12,513,046 B2
(45) Date of Patent: Dec. 30, 2025

(54) CENTRAL COMMUNICATION UNIT OF PURPOSE-BUILT VEHICLE AND METHOD OF CONFIGURING DYNAMIC NETWORK THEREOF

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 555 days.

(21) Appl. No.: 17/684,739

(22) Filed: Mar. 2, 2022

(65) Prior Publication Data
US 2022/0286357 A1 Sep. 8, 2022

(30) Foreign Application Priority Data
Mar. 2, 2021 (KR) .................. 10-2021-0027682

(51) Int. Cl.
| | |
|---|---|
| H04L 41/0816 | (2022.01) |
| H04L 12/18 | (2006.01) |
| H04L 12/40 | (2006.01) |
| H04L 12/403 | (2006.01) |
| H04L 41/0866 | (2022.01) |

(52) U.S. Cl.
CPC ......... *H04L 41/0816* (2013.01); *H04L 12/18* (2013.01); *H04L 12/403* (2013.01); *H04L 41/0866* (2013.01); *H04L 2012/40215* (2013.01); *H04L 2012/40273* (2013.01)

(58) Field of Classification Search
CPC ... H04L 41/0816; H04L 12/18; H04L 12/403; H04L 41/0866; H04L 2012/40215; H04L 2012/40273; H04L 41/0893; H04L 12/40; H04L 12/40078; H04L 12/40013; H04L 12/40143; H04W 4/40; H04W 4/06; H04W 24/04; H04W 24/08
See application file for complete search history.

(56) References Cited

U.S. PATENT DOCUMENTS

| | | | |
|---|---|---|---|
| 9,763,094 B2 | 9/2017 | Thelen et al. | |
| 2010/0256860 A1* | 10/2010 | Yamada | G01M 17/00 701/29.6 |

(Continued)

FOREIGN PATENT DOCUMENTS

| | | |
|---|---|---|
| CN | 104125152 A | 10/2014 |
| CN | 106656701 A | 5/2017 |

(Continued)

OTHER PUBLICATIONS

Office Action issued on Apr. 29, 2023 in corresponding Chinese patent application No. 202210204522.8.

(Continued)

*Primary Examiner* — Derrick W Ferris
*Assistant Examiner* — M Mostazir Rahman
(74) *Attorney, Agent, or Firm* — NovoTechIP International PLLC (57) ABSTRACT

Provided is a method of configuring a dynamic network in a central communication unit (CCU) of a purpose-built vehicle, which dynamically reconfigures a network for a controller connected to the CCU as a predetermined module is changed in the purpose-built vehicle.

14 Claims, 9 Drawing Sheets

(56) References Cited

U.S. PATENT DOCUMENTS

| | | | | |
|---|---|---|---|---|
| 2016/0170775 A1* | 6/2016 | Rockwell | ............ | G06F 13/4282 |
| | | | | 713/100 |
| 2019/0325666 A1* | 10/2019 | Teraoka | ............... | G07C 5/0808 |
| 2023/0004375 A1* | 1/2023 | Adachi | ................... | G06F 13/00 |
| 2023/0006860 A1* | 1/2023 | Aiba | ................. | H04L 12/40013 |

FOREIGN PATENT DOCUMENTS

| | | |
|---|---|---|
| CN | 110610092 A | 12/2019 |
| JP | 2008005396 A | 1/2008 |
| KR | 101975104 B1 | 5/2019 |
| KR | 102144092 B1 | 8/2020 |

OTHER PUBLICATIONS

Extended European Search Report issued on Jul. 4, 2022 in corresponding European Patent Application No. 22159725.5.

\* cited by examiner

CENTRAL COMMUNICATION UNIT OF PURPOSE-BUILT VEHICLE AND METHOD OF CONFIGURING DYNAMIC NETWORK THEREOF

CROSS-REFERENCE TO RELATED APPLICATIONS

This application claims priority to and the benefit of Korean Patent Application No. 10-2021-0027682 filed on Mar. 2, 2021, the disclosure of which is incorporated herein by reference in its entirety.

BACKGROUND

1. Technical Field

The present invention relates to a central communication unit of a purpose-built vehicle and a method of configuring a dynamic network thereof.

2. Discussion of Related Art

Since a vehicle has a multi-master distributed processing system, information of another controller is independently required for the operation of one controller.

As the number of controllers is increased, a bandwidth is also increased. In order to satisfy such bandwidth requirements, a multi-channel controller area network (CAN), CAN flexible data-rate (FD), and Ethernet are introduced, and information transmission is required even between networks with different standards. A central communication unit (CCU) is developed for information transmission between hybrid networks and for the entire network.

Figure 1:
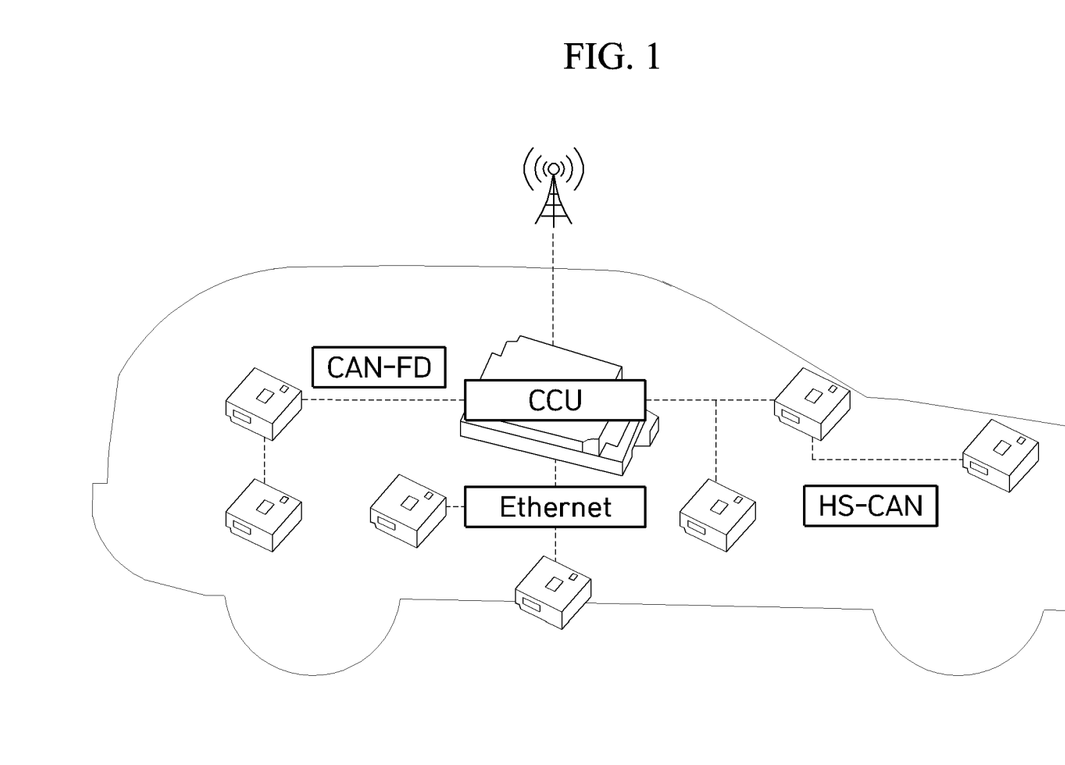
FIG. 1 is a diagram illustrating various hybrid networks used in a central communication unit (CCU)

FIG. 1 is a diagram illustrating various hybrid networks used in the CCU.

Since the function of the vehicle is determined at the development stage, a network configuration and transfer information are predetermined. Therefore, the number of mounted controllers and transfer information are predetermined at the vehicle development stage, and communication is performed on the basis of a predetermined database (DB).

Meanwhile, in a recently proposed purpose-built vehicle, a body module or a drive module of the vehicle can be modified according to the purpose.

In this case, since the number and type of controllers installed in each module are changed according to characteristics of the modules, it is difficult to smoothly exchange information between controllers using the existing static vehicle network configuration method.

In addition, since the configuration of a signal being used is changed according to the period when the controller is manufactured, accurate information exchange is not possible unless modules are manufactured in around the same period.

Therefore, when a module is changed in the purpose-built vehicle, it is necessary to check and adjust communication compatibility between controllers connected to the CCU.

SUMMARY

The present invention is directed to providing a central communication unit (CCU) of a purpose-built vehicle, which dynamically reconfigures a network for a controller connected to the CCU as a predetermined module is changed in the purpose-built vehicle, and a method of configuring a dynamic network thereof.

However, problems to be solved by the present invention are not limited to the above problems, and other problems may exist.

According to an aspect of the present invention, there is provided a method of configuring a dynamic network in a CCU of a purpose-built vehicle, which includes broadcasting a request for a response of a diagnostic message identification (ID) to all controllers according to a module change of the purpose-built vehicle, receiving the response of the diagnostic message ID from the controller in response to the broadcasting, checking a controller connected to each network on the basis of the received response of the diagnostic message ID, requesting attribute information including a transmission message, a reception message, message type information, a message signal configuration, and a database (DB) version of the controller on the basis of the response of the diagnostic message ID, collecting responses corresponding to the requesting of the attribute information and generating a DB, and reactivating each controller on the basis of the generated DB and configuring a dynamic network.

In addition, according to another aspect of the present invention, there is provided a central communication unit (CCU), which is capable of configuring a dynamic network in a purpose-built vehicle, including a communication module connected to a plurality of controllers and configured to communicate with the plurality of controllers, a memory in which a program for dynamically configuring a network is stored as a predetermined module in the purpose-built vehicle is changed, and a processor configured to execute the program stored in the memory. In this case, the processor may broadcast a request for a response of a diagnostic message identification (ID) to all controllers through a communication module and receive the response of the diagnostic message ID from each of the controllers in response to the broadcasting, and the processor may confirm a controller connected to each network on the basis of the received response of the diagnostic message ID, request attribute information including a transmission message, a reception message, message type information, a message signal configuration, and a database (DB) version of the controller on the basis of the diagnostic message ID, collect responses corresponding to the attribute information request to generate a DB, and reactivate each controller on the basis of the generated DB to configure a dynamic network.

According to still another aspect of the present invention, there is provided a computer program which is combined with a computer, which is hardware, to execute a central communication unit (CCU) of a purpose-built vehicle and perform a method of configuring a dynamic network and which is stored in a computer-readable recording medium.

The details of other example embodiments of the present invention are included in the detailed description and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Advantages, features, and implementations thereof will be apparent from embodiments which are described in detail below together with the accompanying drawings. The present invention may, however, be implemented in many different forms and should not be construed as being limited to the embodiments set forth herein, and the embodiments are provided such that this disclosure will be thorough and complete and will fully convey the scope of the present invention to those skilled in the art to which the present invention pertains, and the present invention is defined by only the scope of the appended claims.

Terms used herein are for the purpose of describing the embodiments and are not intended to limit the present invention. In this disclosure, the singular forms include the plural forms unless the context clearly dictates otherwise. It is noted that the terms "comprises" and/or "comprising" used herein does not exclude the presence or addition of one or more other components in addition to stated components. The same reference numerals refer to the same components throughout this disclosure, and the term "and/or" includes each of the stated components and one or more combination thereof. Although the terms first, second, and the like are used to describe various components, these components are substantially not limited by these terms. These terms are used only to distinguish one component from another component. Therefore, a first component described below may be substantially a second component within the technical spirit of the present invention.

Unless defined otherwise, all terms (including technical and scientific terms) used herein may be used in a sense commonly understood by those skilled in the art to which the present invention pertains. In addition, terms defined in a commonly used dictionary are not to be interpreted ideally or excessively unless specifically defined explicitly.

In the description of the present invention, a method of dynamically configuring a network when a module exchange occurs for a purpose-built vehicle will be described. In describing, a method of checking and adjusting communication compatibility between controllers will be described together.

Figure 2A:
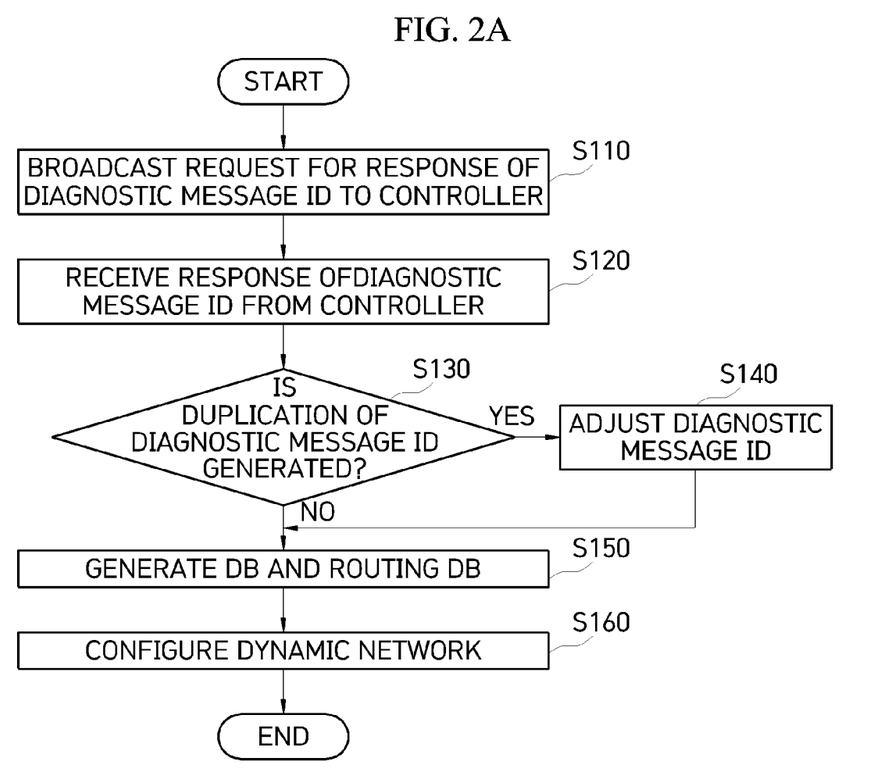
FIG. 2A is a flowchart for describing a process of configuring a dynamic network according to one embodiment of the present invention.

FIG. 2A is a flowchart for describing a process of configuring a dynamic network according to one embodiment of the present invention.

Figure 5:
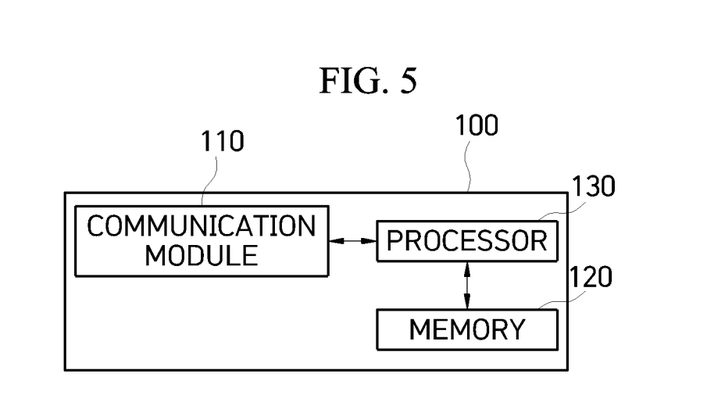
FIG. 5 is a diagram for describing a CCU according to one embodiment of the present invention.

Meanwhile, each operation shown in FIG. 2A may be understood to be performed by a central communication unit (CCU) 100 shown in FIG. 5, but the present invention is not necessarily limited thereto.

In the method of configuring a dynamic network according to one embodiment of the present invention, first, as a predetermined module in a purpose-built vehicle is changed, the CCU 100 broadcasts a request for a response of a diagnostic message ID to all controllers (S110).

Since all communication networks used in a vehicle are connected to the CCU 100, when a predetermined module configuration is changed, the CCU 100 should check first the connected controllers using a diagnostic message.

Figure 2B:
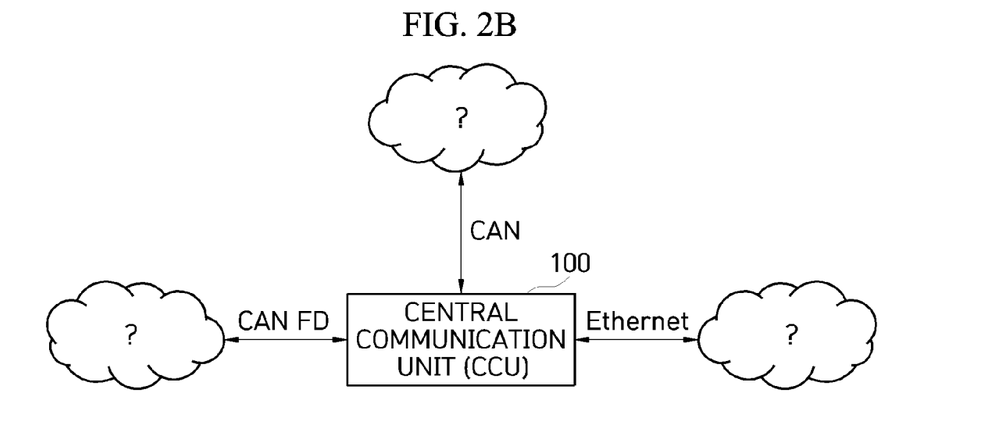
FIG. 2B is a diagram illustrating an example of vehicle communication network information after a module is changed.
Figure 2C:
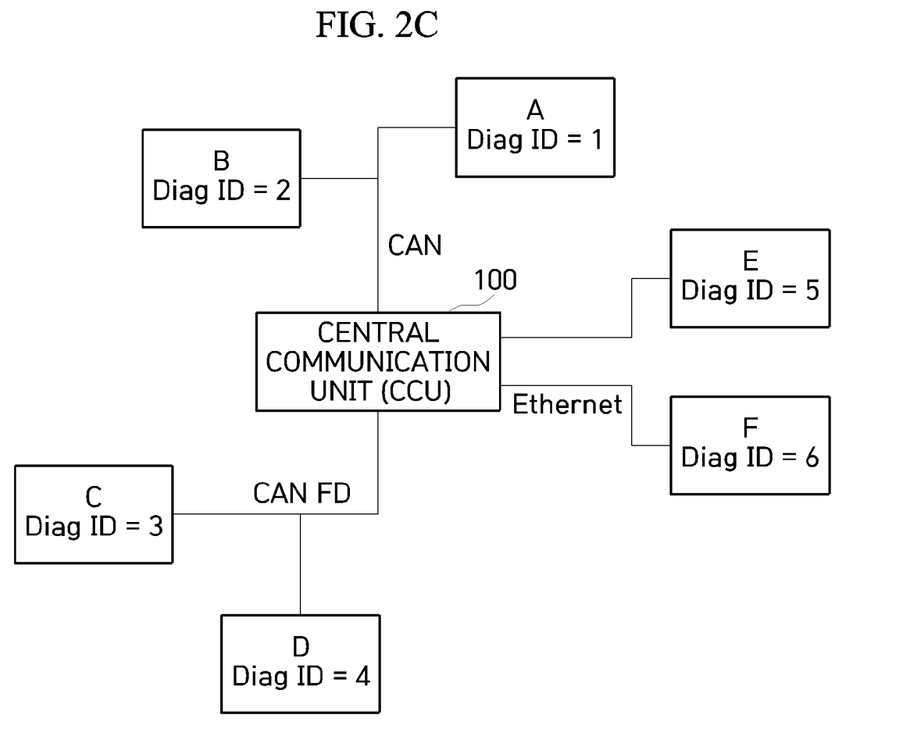
FIG. 2C is a diagram illustrating an example of a network configuration after a controller responds with a diagnostic message identification (ID)

FIG. 2B is a diagram illustrating an example of vehicle communication network information after a module is changed. FIG. 2C is a diagram illustrating an example of a network configuration after a controller responds with a diagnostic message ID.

In this case, as shown in FIG. 2B, when the module change occurs, since the CCU 100 cannot know information on a controller connected to each network, in order to check the controller connected to each network, first, a request for responding with the diagnostic message ID used by each controller is broadcast.

Then, the CCU 100 receives the response of the diagnostic message ID from the controller corresponding to the broadcasting (S120) and checks the controller connected to each network on the basis of the received diagnostic message ID.

As shown in FIG. 2C, when each controller responds with the diagnostic message ID, the CCU 100 may know that the controller having a corresponding diagnostic message ID is connected to each communication network.

Figure 2D:
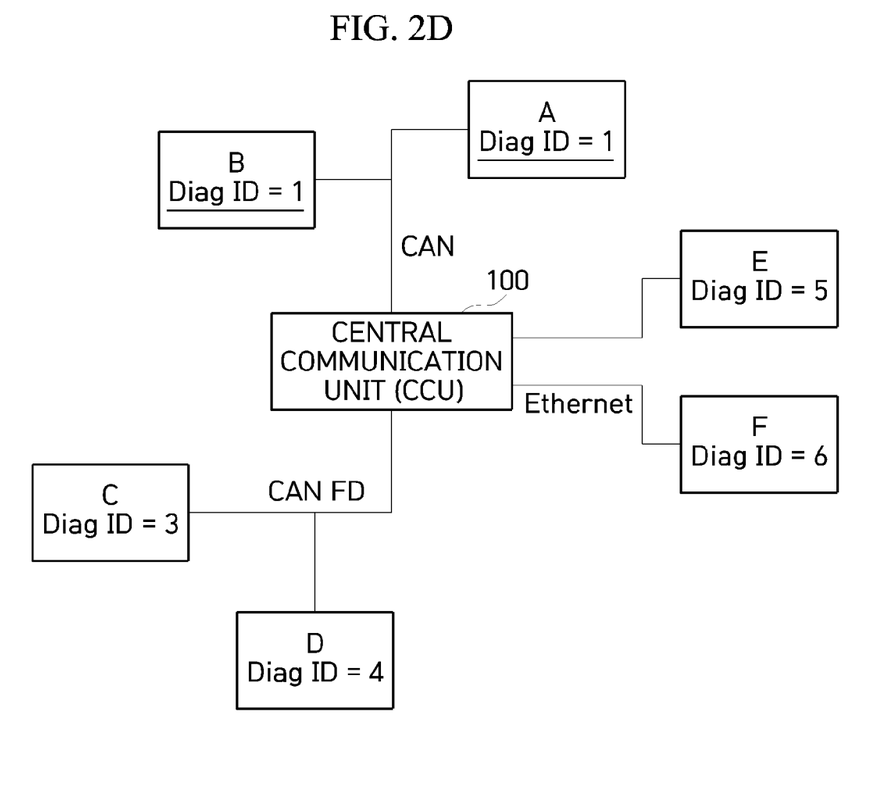
FIG. 2D is a diagram for describing a case in which diagnosis message IDs are the same.
Figure 2E:
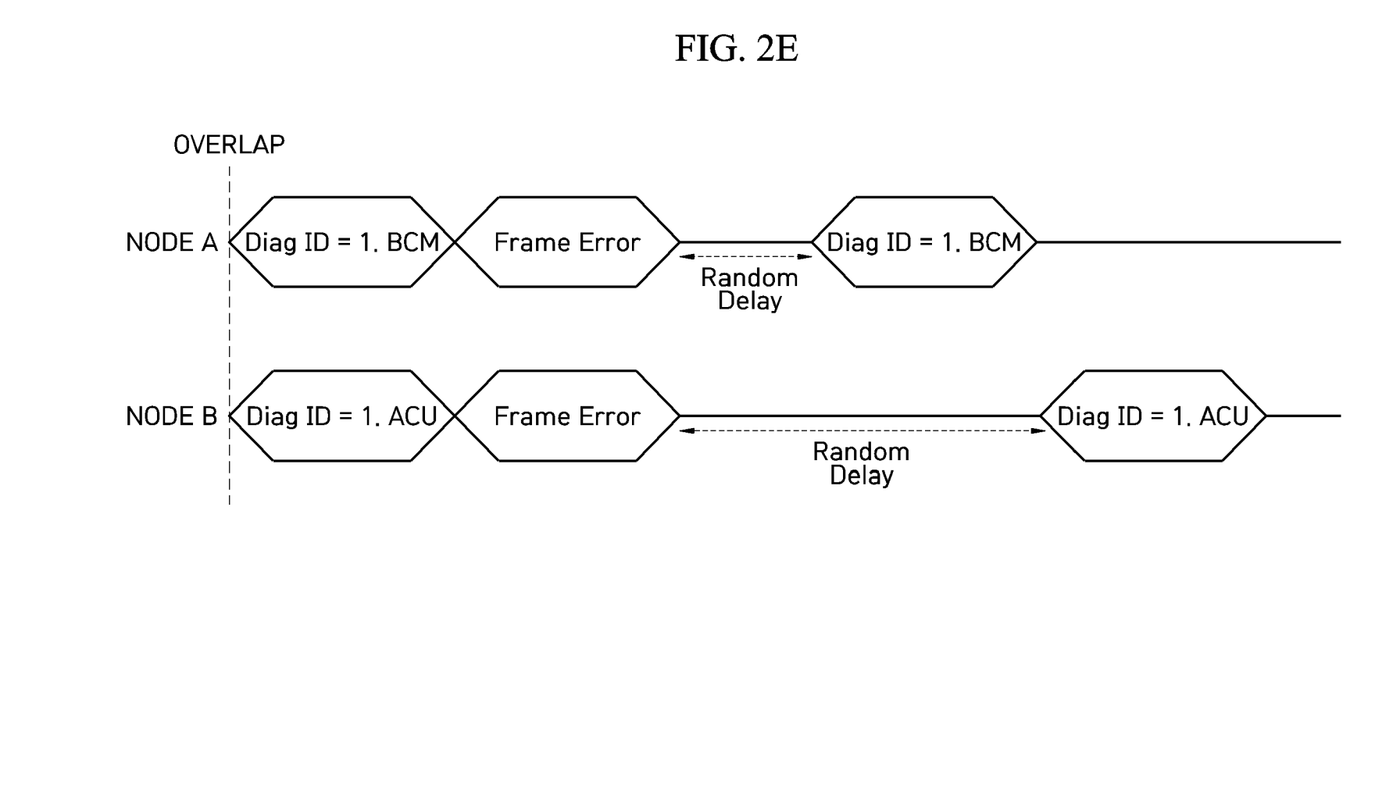
FIG. 2E is a diagram illustrating an example of adding an arbitrary delay time when a communication failure occurs.

FIG. 2D is a diagram for describing a case in which diagnosis message IDs are the same. FIG. 2E is a diagram illustrating an example of adding an arbitrary delay time when a communication failure occurs.

Meanwhile, as shown in FIG. 2D, when a predetermined module is changed in the purpose-built vehicle, since a manufacturing time of the controller installed in each module may be different, the diagnostic message IDs of different controllers connected to the networks may be the same. In this case, in response to the request for the response of the diagnostic message ID, the CCU 100 may simultaneously receive responses from a controller A and a controller B, and consequently, communication between the controllers fails due to message duplication. Alternatively, when the CCU 100 communicates with the individual controller through the diagnostic message ID, it is impossible to receive information because two controllers A and B respond.

In order to solve the above problem, according to one embodiment of the present invention, it is checked whether there is a controller with a communication failure due to duplicated diagnostic message IDs among all the controllers (S130).

In addition, in the checking result, in the case of the presence of duplicated diagnostic message IDs, first, in order not to fail a request process of the response of the diagnostic message ID, when a communication failure (error frame) occurs in a corresponding response, as shown in FIG. 2E, the response of the diagnostic message ID is re-received by adding an arbitrary delay time in a retransmission process to a corresponding controller. The re-reception process is repeatedly performed until the response of the diagnostic message ID is re-received from the corresponding controller.

In this case, when a network of the controllers having the duplicated diagnostic message IDs uses Ethernet, the CCU 100 does not separately add a delay time. In the case of Ethernet, since communication is performed in a one-to-one manner, even when the duplicated diagnostic message IDs are generated, communication always succeeds, and thus no arbitrary delay time is added.

When the diagnostic message ID is re-received from the corresponding controller and thus a physical communication process succeeds, as shown in FIG. 2D, the CCU 100 may check that the controller A and the controller B use the same diagnostic message ID.

Therefore, the CCU 100 checks classification information on controllers to identify each controller and requests to change the diagnostic message ID to any one of the identified controllers (S140).

For example, the controller A and the controller B may be distinguished by classification numbers (0X01 BCM, 0X02 ACU, and the like) of the controllers, which are included in the content of the response of the diagnostic message ID. The CCU 100 checking the classification information requests to change the diagnostic message ID of the controller, whose diagnostic message ID is 1 and the classification number is B, to 2 through the broadcasting process again, and thus duplication of the diagnostic message IDs of the controller A and the controller B may be solved.

Next, the CCU 100 checks connection information of each controller on the basis of the diagnostic message ID and requests for attribute information including a transmission message, a reception message, message type information, a message signal configuration, and a database (DB) version of the controller.

In addition, the CCU 100 generates a DB by collecting responses corresponding to each attribute information request (S150) and reactivates each controller on the basis of the generated DB to configure a dynamic network (S160).

Figure 2F:
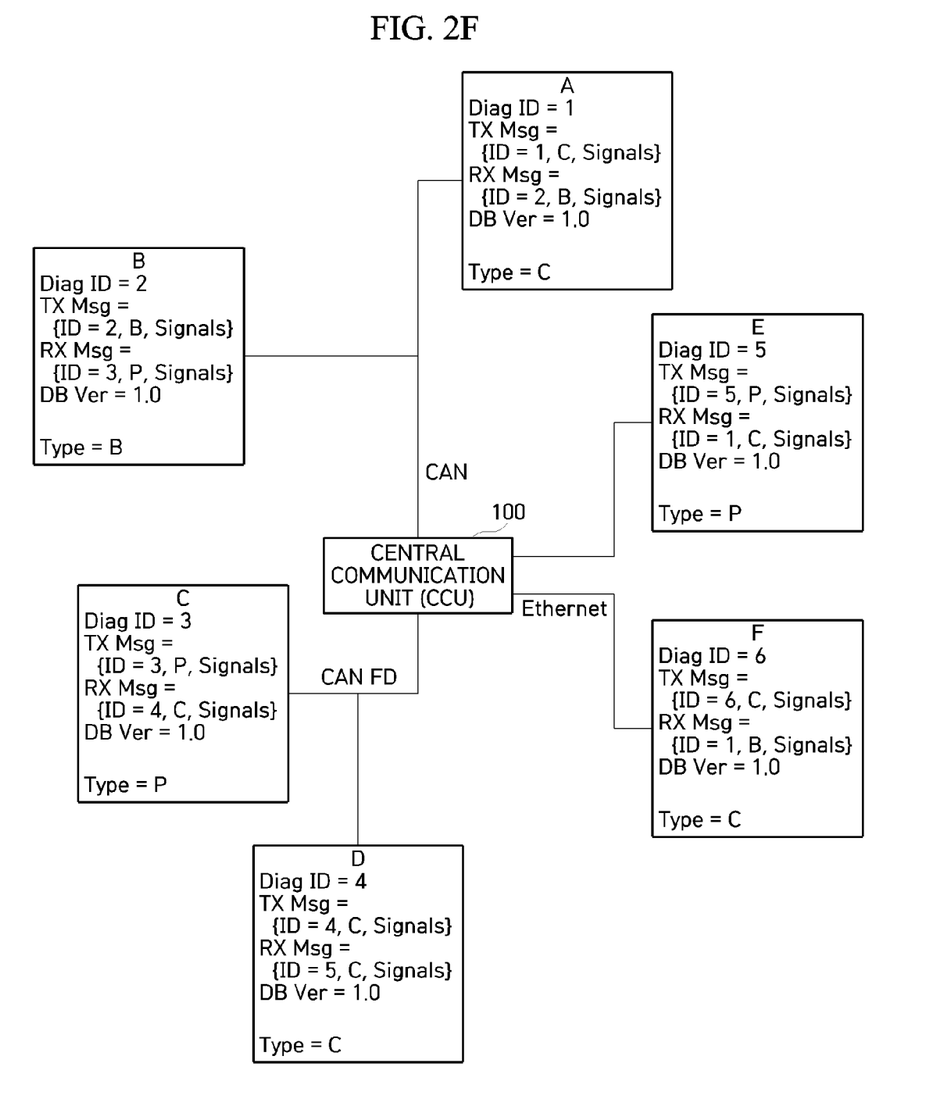
FIG. 2F is a diagram illustrating an example of the result of checking attribute information using a diagnostic message ID of a controller.

FIG. 2F is a diagram illustrating an example of the result of checking attribute information using a diagnostic message ID of a controller.

The CCU 100 checks an independent diagnostic message ID for each controller and then requests transmission/reception messages and message type information, a message signal configuration, and version information on the DB using the diagnostic message ID of each controller.

Then, the CCU 100 collects responses from the controllers and generates a DB as shown in Table 1 below.

TABLE 1

| Network | Node | Diag ID | Tx Msg | | | Rx Msg | | | DB Ver. |
|---|---|---|---|---|---|---|---|---|---|
| | | | ID | Type | Signals | ID | Type | Signals | |
| CAN | A | 1 | 1 | C | ... | 2 | B | ... | 1.0 |
| CAN | B | 2 | 2 | B | ... | 3 | P | ... | 1.0 |
| CAN FD | C | 3 | 3 | P | ... | 4 | C | ... | 1.0 |
| CAN FD | D | 4 | 4 | C | ... | 5 | C | ... | 1.0 |
| Ethernet | E | 5 | 5 | P | ... | 6 | C | ... | 1.0 |
| Ethernet | F | 6 | 6 | C | ... | 1 | C | ... | 1.0 |

In addition to the above description, as one example, the CCU 100 may extract some pieces of the attribute information from the generated DB to generate a routing DB (RDB). That is, in the case of a message requiring information exchange between networks, the CCU 100 may generate an RDB by extracting some information as shown in Table 2 below.

TABLE 2

| ID | Type | Source Network | Destination Network |
|---|---|---|---|
| 1 | C | CAN | Ethernet |
| 3 | P | CAN FD | CAN |
| 5 | P | Ethernet | CAN FD |

Figure 3A:
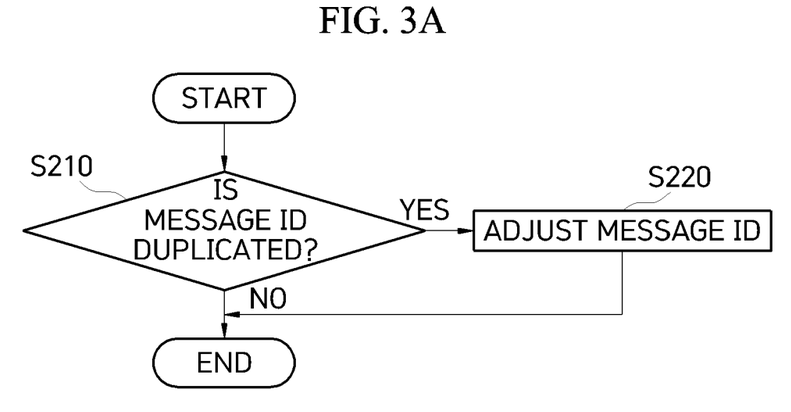
FIGS. 3A and 3B are flowcharts for describing a case in which message IDs of controllers connected to the same network are the same.
Figure 3B:
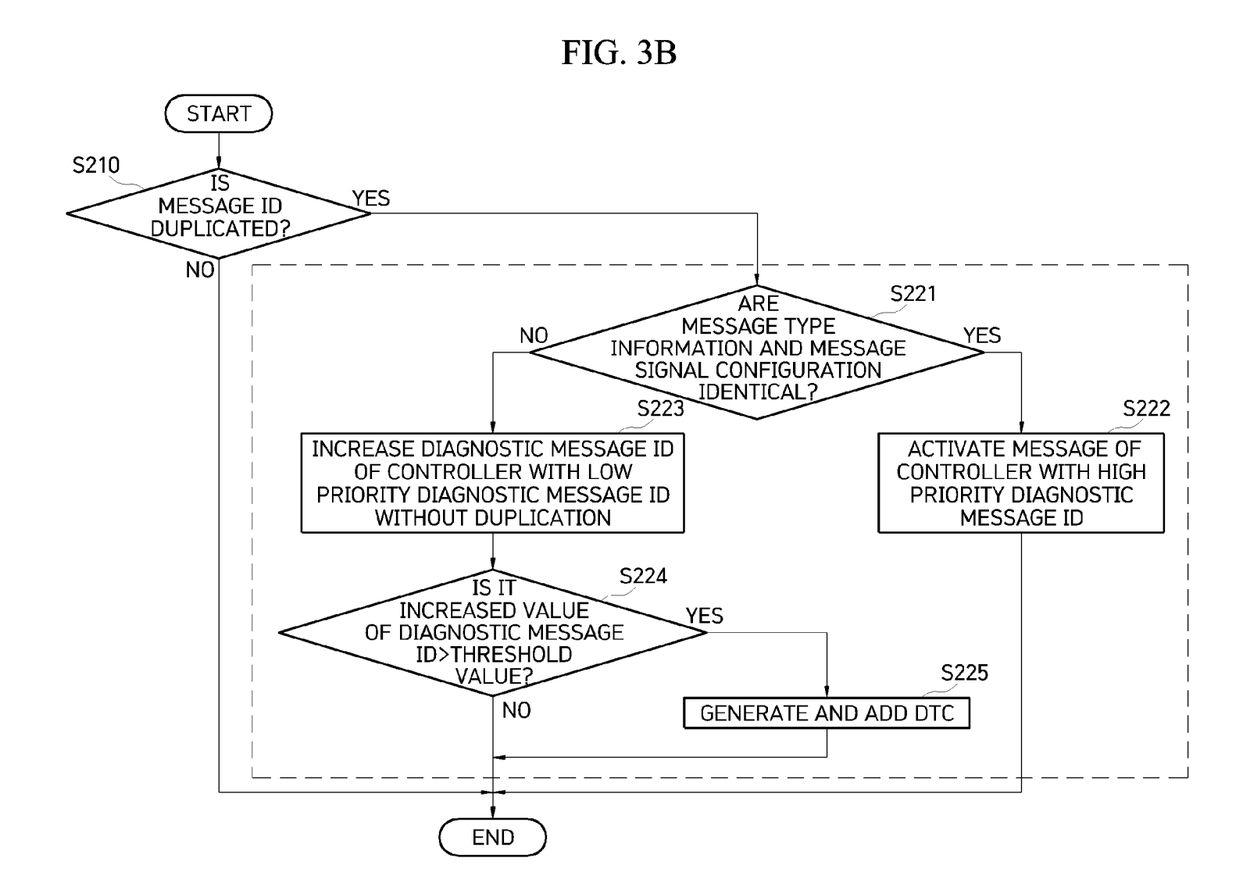

FIGS. 3A and 3B are flowcharts for describing a case in which message IDs of controllers connected to the same network are the same.

Meanwhile, in one embodiment of the present invention, there may be a case in which messages of controllers connected to the same network among all the controllers have the same ID as shown in Table 3. In this case, the CCU 100 may check whether duplicated messages are present (S210) and then adjust IDs of the duplicated messages, thereby solving a problem of the duplicated messages (S220).

TABLE 3

| Network | Node | Diag ID | Tx Msg | | | Rx Msg | | | DB Ver. |
|---|---|---|---|---|---|---|---|---|---|
| | | | ID | Type | Signals | ID | Type | Signals | |
| CAN | A | 1 | 1 | C | ... | 1 | B | ... | 1.0 |
| CAN | B | 2 | 1 | B | ... | 3 | P | ... | 1.0 |
| CAN FD | C | 3 | 3 | P | ... | 4 | C | ... | 1.0 |
| CAN FD | D | 4 | 4 | C | ... | 5 | C | ... | 1.0 |
| Ethernet | E | 5 | 5 | P | ... | 6 | C | ... | 1.0 |
| Ethernet | F | 6 | 6 | C | ... | 1 | C | ... | 1.0 |

Specifically, in order to check that the IDs having the same message are different messages, the CCU 100 compares the message type information and the message signal configuration (S221). In addition, the CCU 100 activates and removes the message on the basis of the comparison result and the priority of each controller corresponding to the duplicated messages.

As one example, in the comparison result, when the pieces of message type information and the message signal configurations of the duplicated messages are exactly the same (YES in S211), the CCU 100 activates a message of the controller having the high priority diagnostic message ID among the controllers corresponding to the duplicated messages and removes the message of the controller having the low priority (S222). That is, when two values are completely identical, the CCU 100 activates only the message corresponding to the controller with a diagnostic message ID having a low value.

Here, the priority of the diagnostic message ID has a higher priority as the value of the ID is lower.

On the other hand, in the comparison result, when at least one of the pieces of message type information and the message signal configurations of the duplicated messages is different (NO in S221), the CCU 100 increases a value of the diagnostic message ID of a controller having the low priority message ID among the controllers corresponding to the duplicated messages so as not to overlap the message IDs of the remaining controllers (S223).

When the increased value of the message ID exceeds a predetermined threshold value (YES in S224), the priority of the message is significantly lowered, and thus the CCU 100 may generate and add a diagnostic trouble code (DTC), thereby rechecking whether a module exchange process is performed normally (S225).

As described above, after the DB is configured using message information of the connected controller, the CCU 100 may perform a process of checking communication compatibility.

Figure 4:
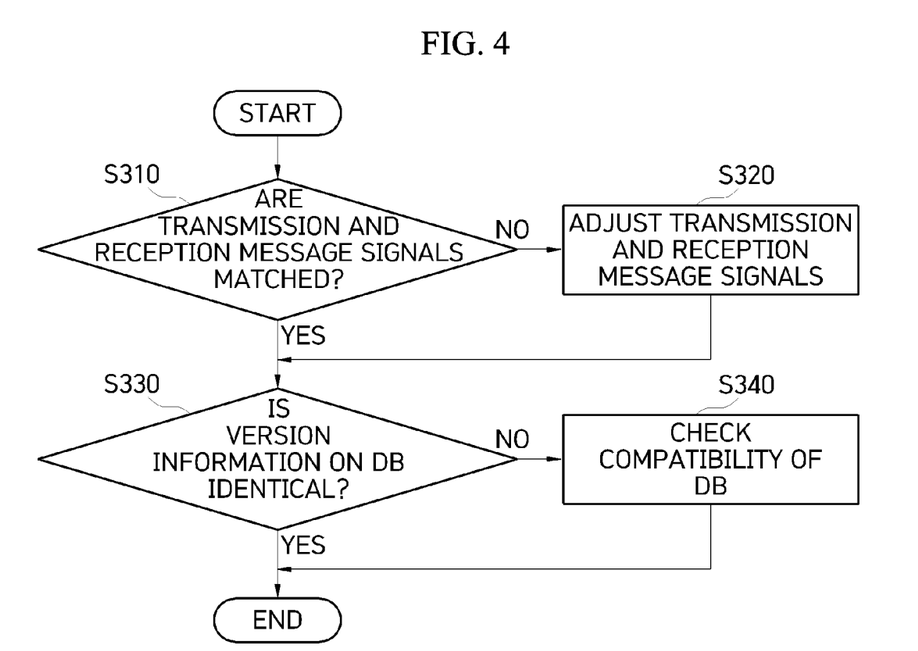
FIG. 4 is a flowchart for describing a process of checking communication compatibility.

FIG. 4 is a flowchart for describing a process of checking communication compatibility.

Specifically, the CCU 100 matches transmission and reception message signals between the controllers on the basis of the configured DB and checks compatibility of each controller connected to the CCU 100 on the basis of the matching result (S310). Then, the CCU 100 adjusts to maintain compatibility between the controllers which are determined to be incompatible in the checking result (S320).

In this case, in one embodiment of the present invention, the compatibility checking and adjustment methods may be differently performed on the basis of whether the CCU 100 is connected to an external Internet network.

As one example, in a state of being not connected to an external network, the CCU 100 may determine that there is a problem in compatibility on the basis of a predetermined rule.

First, in the matching result, when locations of the transmission/reception message signals do not match, the CCU 100 may determine that a compatibility problem is present in the controllers that do not match. In addition, the CCU 100 may adjust the locations of the transmission/reception message signals of the controllers that do not match to maintain compatibility between the controllers.

As another example, when the number of bits of the transmission/reception message signals does not match in a state of being not connected to an external network, the CCU 100 may determine that a compatibility problem is present in the controllers that do not match. In addition, the CCU 100 may adjust to maintain compatibility between the controllers using a transmission/reception message with a smaller number of bits of the transmit/receive message signals of the controllers that do not match.

Alternatively, when the number of bits of the transmission and reception message signals does not match in a state of being connected to an external network, the CCU 100 may inquire a corresponding content to a DB management server through an external Internet network, thereby checking compatibility.

In addition, when the controller includes version information different from the DB version information in a state in which the CCU 100 is connected to an external network, the CCU 100 may inquire a corresponding content to the DB management server through an external Internet network, thereby checking compatibility. In this case, the CCU 100 also inquires information on the mounted controller to the DB management server, and when a signal of a specific controller disappears, the CCU 100 may receive a signal of a replaceable controller to change the DB and the RDB.

As one example, when a controller among the controllers connected to the CCU 100 includes version information different from the version information on the DB configured according to the previous operation (S330), since the controller may differently interpret the same value, the CCU 100 may check compatibility of the controller on the basis of a compatibility summary table stored in the CCU 100 (S340). Since the configuration of the DB used in the vehicle is not significantly changed unless the generation changes, when a compatibility summary table is generated based on changed contents, it is possible to check whether a signal is compatible even when the DB version used by the controller is different.

In addition, when a first controller connected to the CCU 100 before being changed to a predetermined module is excluded as it is changed to the predetermined module, the CCU 100 may replace the first controller with a second controller on the basis of the matching result of the transmission/reception message signals, thereby maintaining compatibility. That is, when a required specific controller signal is not present, the CCU 100 may replace the required specific controller signal with a similar controller signal. For example, in a state in which a controller needing to receive vehicle speed information from an electronic stability control (ESC) controller is present, when the ESC controller is excluded due to module exchange in a purpose-built vehicle, the CCU 100 may perform matching on the basis of the transmission/reception message signals and change the DB and the RDB so as to transfer vehicle speed information of a cluster or the like, thereby maintaining compatibility.

Through the above process, the CCU 100 according to one embodiment of the present invention may transmit the finally adjusted DB to each controller and allow each controller to activate communication on the basis of the DB in the latest state. In this case, since a signal of the message or the DB version, which is received by the controller, may be varied, the CCU 100 checks whether a function of the controller is operated on the basis of received information. In addition, when a problem does not occur in the function of the controller, the controller is reactivated to provide overall functions or a limited function. In addition, the CCU 100 performs a message transfer function between networks on the basis of the adjusted RDB.

On the other hand, when the predetermined module is changed and thus required essential functions are not activated, the CCU 100 may generate a DTC to check validity of the performed module change process.

Meanwhile, in the above description, operations S110 to S340 may be further divided into a larger number of operations or combined into a smaller number of operations according to the embodiments of the present invention. In addition, some operations may be omitted, when necessary, and the order between operations may be changed. In addition, although there are omitted contents, the content of FIGS. 2A to 4 may also be applied to the content of FIG. 5.

Hereinafter, a CCU (hereinafter, referred to as the CCU 100) capable of configuring a dynamic network in a purpose-built vehicle according to one embodiment of the present invention will be described with reference to FIG. 5.

FIG. 5 is a diagram for describing the CCU 100 according to one embodiment of the present invention.

The CCU 100 according to one embodiment of the present invention includes a communication module 110, a memory 120, and a processor 130.

The communication module 110 is connected to a plurality of controllers through a predetermined communication network and performs communication.

The memory 120 stores a program for dynamically configuring a network of controllers which are connected as a predetermined module in the purpose-built vehicle is changed, and the processor 130 executes the program stored in the memory 120.

As the predetermined module is changed, the processor 130 broadcasts a request for a response of a diagnostic message ID to all controllers through the communication module 110 and receives the response of the diagnostic message ID from each of the controllers in response to the broadcasting.

Then, the processor 130 checks a controller connected to each network on the basis of the received diagnostic message ID, requests attribute information including a transmission message, a reception message, message type information, a message signal configuration, and a DB version of the controller on the basis of the diagnostic message ID, collects responses corresponding to the attribute information request to generate a DB, and reactivate each controller on the basis of the generated DB to configure a dynamic network.

The above-described method of configuring a dynamic network in the CCU 100 of a purpose-built vehicle according to one embodiment of the present invention may be implemented using a program (or application) to be executed in combination with a computer, which is hardware, and may be stored in a medium.

In order for the computer to read the program and execute the method implemented using the program, the above-described may include code coded using computer languages, such as C, C++, JAVA, Ruby, and a machine language, which may be read by a processor (central processing unit (CPU)) of the computer through a device interface of the computer. The code may include functional code related to a function defining required functions executing the method and include control code related to an execution procedure, which are required for the processor of the computer to execute the required functions according to a predetermined procedure. In addition, the code may further include additional information required for the processor of the computer to execute the required functions or include code related to memory reference in which media refers to which a location (address) in an internal or external memory of the computer. In addition, when the processor of the computer needs to communicate with any other computers or servers in remote locations so as to execute the required functions, the code may further include communication-related code for how to communicate with any other remote computers or servers using a communication module of the computer and communication-related code for which information or media to transmit/receive during communication.

The storage medium refers to a medium which stores data semi-permanently and is readable by a device instead of a medium which stores data for a short period of time, such as a register, a cache, or a memory. Specifically, examples of the storage medium include a read only memory (ROM), a random access memory (RAM), a compact disc (CD)-ROM, a magnetic tape, a floppy disk, and an optical data storage device, but the present invention is not limited thereto. That is, the program may be stored in various recording media of various servers to which the computer can access or in various recording media of the computer of a user. In addition, the storage medium may be implemented in a distributed manner in computer systems connected to a network, and a computer-readable code may be stored in a distributed manner.

In order to configure a purpose-built vehicle, it is essential to replace a hardware module suitable for the purpose. However, since all controllers and information are predetermined in a general vehicle network, it is difficult to exchange information between the controllers.

In accordance with the above-described embodiments of the present invention, a conceptual purpose-built vehicle can be actually implemented through a method of dynamically reconfiguring a network when the replacement of a hardware module occurs.

Since network reconfiguration occurs only in specific situations (module replacement, an end-of-line (EOL), and the like), when a method of configuring a dynamic network according to the present invention is applied to the existing mass-produced vehicle, there is an advantage in that all vehicle models can be mass-produced using a single type of a central communication unit (CCU). Therefore, it is possible to reduce a development cost for each vehicle model and a management cost due to a change of a part number.

In addition, when a controller is added through vehicle modification, it is currently not possible to connect the added controller to a vehicle network. That is, even when a multi-function camera (MFC) applied to a new vehicle is installed in a used vehicle and control unit (MEB) software is updated, an MFC function cannot be operated normally due to mismatch between a message identification (ID) and signal information.

In contrast, in accordance with the embodiments of the present invention, since a task of matching pieces of information in the network is performed, there is an advantage in that an update of a vehicle using a new controller is possible.

It should be noted that effects of the present invention are not limited to the above described effect, and other effects of the present invention not mentioned above can be clearly understood by those skilled in the art from the above description.

The above-described description of the present invention is intended only for an illustrative purpose, and it can be easily understood that other concrete forms can be devised by those skilled in the art without changing or modifying the technical spirit or essential characteristics of the present invention. Therefore, it should be understood that the above-described embodiments are not restrictive but illustrative in all aspects. For example, each component described as a single form may be implemented in a distributed manner, and similarly, components described as being distributed may also be implemented in a combined form.

The scope of the present invention is defined by the appended claims rather than the detailed description, and all changes or modifications derived from the meaning and scope of the claims and equivalents thereto should be construed as being included within the scope of the present invention.

What is claimed is:

1. A method of configuring a dynamic network for a purpose-built vehicle, the purpose-built vehicle including one or more networks, a plurality of modules and a plurality of controllers, each controller connected to the one or more networks, wherein each module is one of a body module and a drive module, includes a different one of the plurality of controllers and is configured to be modifiable according to a purpose of the purpose-built vehicle, the method comprising:
   in response to an occurrence of a change to at least one of the plurality of modules, broadcasting, to the plurality of controllers, a first request to provide a diagnostic message identification (ID) of each of the plurality of controllers;
   receiving, from each of the plurality of controllers, a first response to the broadcasted first request, the first response including the diagnostic message ID of each of the plurality of controllers;
   checking each of the plurality of controllers based on the diagnostic message ID included in the received first response;
   based on the received diagnostic message ID, sending, to each of the plurality of controllers, a second request to provide attribute information including a transmission message, a reception message, message type information, a message signal configuration, and a database (DB) version of the controller;

receiving, from each of the plurality of controllers, a second response to the second request, the second response including the attribute information of each of the plurality of controllers, generating a new DB based on the attribute information included in the received second response from each of the plurality of controllers; and resetting each of the plurality of controllers based on the generated new DB and configuring the dynamic network, wherein the method further comprises:
   detecting a plurality of duplicate messages including one or more of the transmission messages and the reception messages of the controllers connected to a same network and having a duplicate diagnostic message ID;
   comparing the message type information and the message signal configurations of the duplicated messages; and
   activating or removing each of the duplicate messages based on a result of the comparing and a priority of each of the plurality of controllers corresponding to each duplicated message, and wherein activating or removing each of the duplicate messages comprises:
   detecting that the message type information and the message signal configurations of the duplicate messages are identical to each other; and
   removing one of the duplicate messages associated with the controller having a lower priority.

2. The method of claim 1, further comprising:
detecting that a communication with at least one of the plurality of controllers has failed due to a group of diagnostic message IDs respectively received from a group of the controllers being duplicates of each other; and
causing the group of the controllers to respectively resend the second response with different delay times.

3. The method of claim 2, further comprising:
in response to receiving the diagnostic message ID from each of the plurality of controllers, checking classification information of each of the plurality of controllers and identifying the group of the controllers from which the group of the duplicate diagnostic message IDs are respectively received; and
sending, to the group of the controllers, a third request to change the diagnostic message ID.

4. The method of claim 2, wherein:
the group of the controllers comprises a first controller, and
the method further comprising:
   detecting that the first controller is connected to an Ethernet; and
   excluding the first controller from causing the group of the controllers from resending the second response with the different delay times.

5. The method of claim 1, further comprising:
extracting the attribute information from the generated new DB; and
generating a routing DB (RDB).

6. The method of claim 1, further comprising:
matching a plurality of transmission/reception message signals between the controllers based on the generated new DB;

checking, based on a result of the matching, compatibility of each of the plurality of controllers connected to a central communication unit (CCU) with respect to other controllers; and
adjusting the compatibility between the controllers determined to be incompatible with each other.

7. The method of claim 6, wherein:
checking the compatibility of each of the plurality of controllers comprises determining that a compatibility problem is present with respect to the controllers when a plurality of locations of the transmission/reception message signals do not match, and
adjusting the compatibility between the controllers comprises adjusting the locations of the transmission/reception message signals of the controllers that do not match and maintaining the compatibility between the controllers.

8. The method of claim 6, wherein:
checking the compatibility of each of the plurality of controllers comprises determining that a compatibility problem is present with respect to the controllers when a number of bits of the transmission/reception message signals do not match when the CCU is not connected to an external network; and
adjusting the compatibility between the controllers comprises adjusting to maintain the compatibility between the controllers using the transmission messages and the reception messages with a smaller number of bits of the transmission/reception message signals of the controllers that do not match.

9. The method of claim 6, wherein checking the compatibility of each of the plurality of controllers connected to the CCU comprises checking the compatibility of the controller based on a compatibility summary table stored in the CCU when the controller connected to the CCU includes first version information different from second version information of the configured DB.

10. The method of claim 6, wherein checking the compatibility of each of the plurality of controllers connected to the CCU comprises causing the CCU to inquire a DB management server and to check the compatibility when transmission/reception message signals that do not match are present in a result of the matching or the controller including first version information different from second version information of the DB is present while the CCU is connected to an external network.

11. The method of claim 6, wherein:
the controllers comprise first and second controllers, and
adjusting the compatibility between the controllers comprises replacing the first controller with the second controller based on a result of the matching, and adjusting and maintaining the compatibility when the first controller connected to the CCU before the module change is excluded from the module change.

12. A method of configuring a dynamic network for a purpose-built vehicle, the purpose-built vehicle including one or more networks, a plurality of modules and a plurality of controllers, each controller connected to the one or more networks, wherein each module is one of a body module and a drive module, includes a different one of the plurality of controllers and is configured to be modifiable according to a purpose of the purpose-built vehicle, the method comprising:
in response to an occurrence of a change to at least one of the plurality of modules, broadcasting, to the plurality of controllers, a first request to provide a diagnostic message identification (ID) of each of the plurality of controllers;

receiving, from each of the plurality of controllers, a first response to the broadcasted first request, the first response including the diagnostic message ID of each of the plurality of controllers;

checking each of the plurality of controllers based on the diagnostic message ID included in the received first response;

based on the received diagnostic message ID, sending, to each of the plurality of controllers, a second request to provide attribute information including a transmission message, a reception message, message type information, a message signal configuration, and a database (DB) version of the controller;

receiving, from each of the plurality of controllers, a second response to the second request, the second response including the attribute information of each of the plurality of controllers, generating a new DB based on the attribute information included in the received second response from each of the plurality of controllers; and resetting each of the plurality of controllers based on the generated new DB and configuring the dynamic network, wherein the method further comprises:
detecting a plurality of duplicate messages including one or more of the transmission messages and the reception messages of the controllers connected to a same network and having a duplicate diagnostic message ID;

comparing the message type information and the message signal configurations of the duplicated messages; and activating or removing each of the duplicate messages based on a result of the comparing and a priority of each of the plurality of controllers corresponding to each duplicated message, and wherein activating or removing each of the duplicate comprises:
detecting that at least one of the message type information and the message signal configurations of the duplicate messages is different from the other; and
increasing a value of the diagnostic message ID of one of the controllers having a lower priority message ID.

13. The method of claim 12, wherein increasing of the value of the diagnostic message ID comprises:
detecting that the increased value of the message ID exceeds a predetermined threshold value; and
generating and adding a diagnostic trouble code (DTC) to the diagnostic message ID.

14. A central communication unit (CCU) for configuring a dynamic network in a purpose-built vehicle, the purpose-built vehicle including one or more networks, a plurality of modules and a plurality of controllers connected to the one or more networks, wherein each module is one of a body module and a drive module, includes a different one of the plurality of controllers, and is configured to be modifiable according to a purpose of the purpose-built vehicle, the CCU comprising:

a processor; and
a non-transitory computer-readable medium in communication with the processor and storing instructions that, when executed by the processor, cause the processor to control the CCU to perform:
in response to an occurrence of a change to at least one of the plurality of modules, broadcasting, to the plurality of controllers, a first request to provide a diagnostic message identification (ID);
receiving, from each of the controllers, a first response to the broadcasted first request, the first response including the diagnostic message ID;
checking each of the plurality of controllers based on the diagnostic message ID included in the received first response;
based on the diagnostic message ID included in the received first response, sending, to each of the plurality of controllers, a second request to provide attribute information of each of the plurality of controllers, the attribute information including a transmission message, a reception message, message type information, a message signal configuration, and a database (DB) version of each of the plurality of controllers;
receiving, from each of the plurality of controllers, a second response to the broadcasted second request, the second response including the attribute information;
generating a new DB based on the attribute information included in the second response received from each of the plurality of controllers; and
resetting the plurality of controllers based on the generated new DB and configuring the dynamic network, wherein the instructions, when executed by the processor, cause the processor to control the CCU to perform:
detecting a plurality of duplicate messages including one or more of the transmission messages and the reception messages of the controllers connected to a same network and having a duplicate diagnostic message ID;
comparing the message type information and the message signal configurations of the duplicated messages; and
activating or removing each of the duplicate messages based on a result of the comparing and a priority of each of the plurality of controllers corresponding to each duplicated message, and wherein, for activating or removing each of the duplicate messages, the instructions, when executed by the processor, cause the processor to control the CCU to perform:
detecting that the message type information and the message signal configurations of the duplicate messages are identical to each other; and
removing one of the duplicate messages associated with the controller having a lower priority.

* * * * *